P. HENZE.
BATHOMETER.
APPLICATION FILED JUNE 4, 1907.
900,537.
Patented Oct. 6, 1908.
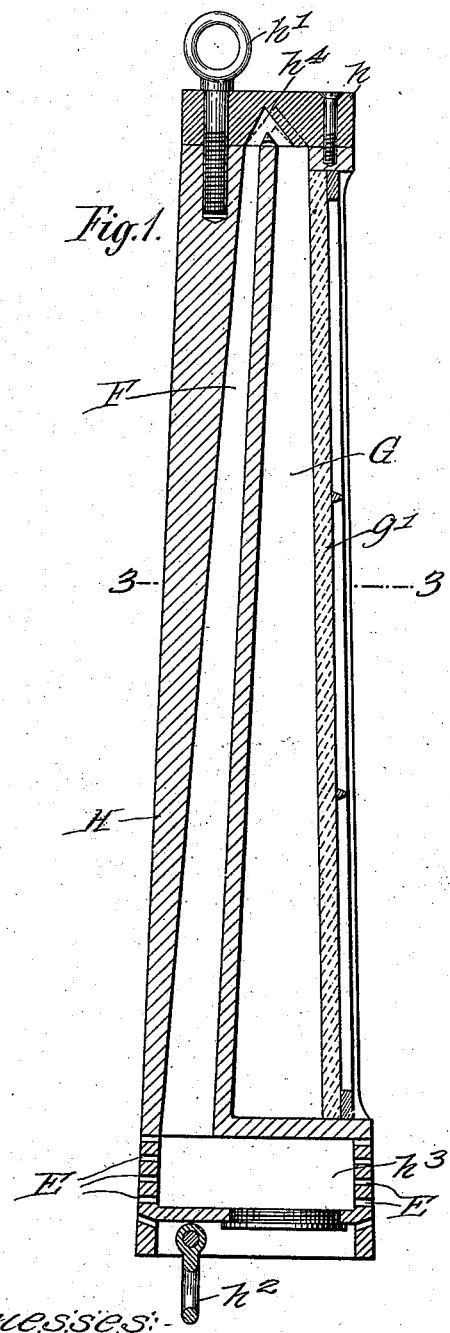
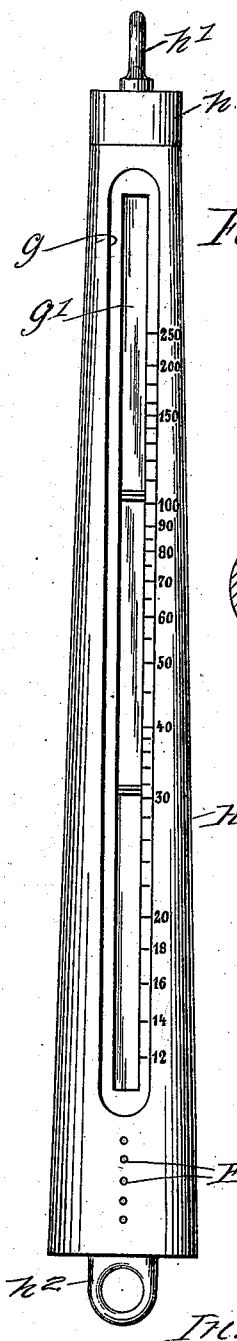
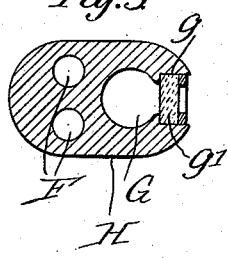
Witnesses:
C. H. Crawford
E. Schallinger
Inventor:
Paul Henze
by P. Kruger
Attorney

UNITED STATES PATENT OFFICE.

PAUL HENZE, OF LEHE, GERMANY.

BATHOMETER.

No. 900,537.     Specification of Letters Patent.     Patented Oct. 6, 1908.

Application filed June 4, 1907. Serial No. 377,202.

*To all whom it may concern:*

Be it known that I, PAUL HENZE, manufacturer, a subject of the Emperor of Germany, residing at Lehe, in Germany, have invented certain Improvements in Bathometers, of which the following is a specification.

This invention relates to improvements in bathometers of that class wherein a graduated indicating tube is provided for indicating the depth of water sounded.

The novel feature of the invention consists in one or more inlet tubes or channels communicating with the measuring tube in such a manner as to facilitate emptying the measuring tube after the depth has been ascertained.

The invention will be more fully described in connection with the accompanying drawing and will be more particularly pointed out and ascertained in and by the appended claims.

In the drawings:—Figure 1, is a vertical sectional view of a bathometer embodying the main features of my invention. Fig. 2, is a front elevation thereof. Fig. 3, is a sectional view on line 3—3 of Fig. 1.

Like characters of reference designate similar parts throughout the different figures of the drawing:—

As shown the invention is embodied in a unitary structure designated as a whole by H, and provided with a removable top or cover $h$, having a suitable line eye $h'$, a weight eye $h^2$ being provided on the lower end of the instrument. A measuring compartment or tube is provided and is indicated at G and said tube extends practically throughout the length of the instrument. The front wall of the tube G is slotted as at $g$ and a suitable transparent graduated member $g'$ is fixed in any suitable manner in said slot so as to close the tube G to the exterior.

A compartment $h^3$ may be formed in the bottom of said instrument to communicate with the surrounding water by means of apertures E. Two inlet channels or tubes F, preferably formed integrally in the rear portion of the instrument, extend from said compartment $h^3$ upwardly to the top of and in angular relation with respect to the measuring tube G. Connecting passages $h^4$ establish communication between the inlet tubes F and the measuring tube G.

In sounding, the instrument is lowered in the water and the latter enters through openings E passing upwardly in the tubes F through passages $h^4$ to the measuring tube G. The air in the measuring tube G is compressed in proportion to the depth pressure of the water sounded and the measurement is ascertained by the transparent graduated portion $g'$.

It will be readily seen that by turning the instrument from the position shown into a horizontal position that the water in the measuring tube may be readily emptied.

I claim:—

1. A bathometer comprising a structure provided with a vertically disposed measuring tube having a slotted wall, a transparent graduated member closing said slotted wall, said structure having inlet tubes formed therein in angular relation with respect to said measuring tube and having passages establishing communication between said inlet tubes and measuring tube at the upper ends thereof, said structure having a compartment below said tubes and communicating with said inlet tubes and having inlet openings establishing communication between said compartment and the surrounding water.

2. A bathometer comprising a structure provided with a vertically disposed measuring tube having a slotted wall, a transparent graduated member closing said slotted wall, said structure having an inlet tube in angular relation with respect to said measuring tube and having a passage establishing communication between said inlet tube and measuring tube at the upper ends thereof, said inlet tube communicating with the surrounding water at its lower end.

In witness whereof I have hereunto signed my name this 18th day of May, 1907, in the presence of two subscribing witnesses.

PAUL HENZE.

Witnesses:
   WILF. BACH,
   W. HESSE.